(12) United States Patent
Anderson et al.

(10) Patent No.: US 10,319,145 B2
(45) Date of Patent: Jun. 11, 2019

(54) ASYNCHRONOUS REPRESENTATION OF ALTERNATE REALITY CHARACTERS

(71) Applicant: Intel Corporation, Santa Clara, CA (US)

(72) Inventors: Glen Anderson, Beaverton, OR (US); Wendy March, Portland, OR (US); Giuseppe Raffa, Portland, OR (US); Adam Jordan, El Cerrito, CA (US); Yi Wu, San Jose, CA (US); Rahul C. Shah, San Francisco, CA (US); Lama Nachman, San Francisco, CA (US); Ana P. Rosario, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/997,773

(22) PCT Filed: Mar. 14, 2013

(86) PCT No.: PCT/US2013/031373
§ 371 (c)(1),
(2) Date: Jun. 25, 2013

(87) PCT Pub. No.: WO2014/142881
PCT Pub. Date: Sep. 18, 2014

(65) Prior Publication Data
US 2015/0228117 A1    Aug. 13, 2015

(51) Int. Cl.
*G06T 19/00*    (2011.01)
*G06T 19/20*    (2011.01)
(Continued)

(52) U.S. Cl.
CPC ......... *G06T 19/006* (2013.01); *G06Q 10/101* (2013.01); *G06Q 50/01* (2013.01);
(Continued)

(58) Field of Classification Search
CPC ...... A63F 13/65; G06Q 10/101; G06Q 50/01; G06T 19/006; G06T 19/20; G06T 2207/10016; H04N 5/2224
See application file for complete search history.

(56) References Cited

U.S. PATENT DOCUMENTS 6,570,555 B1 * 5/2003 Prevost ................... G06F 3/01
345/156
9,501,919 B2 * 11/2016 Laett .................. G08B 21/0476
(Continued)

FOREIGN PATENT DOCUMENTS

CN    101180880 A    5/2008
CN    102708120 A    10/2012
(Continued)

OTHER PUBLICATIONS

International Search Report and Written Opinion received for PCT Patent Application No. PCT/US2013/031373, dated Dec. 17, 2013, 13 pages.
(Continued)

*Primary Examiner* — Deirdre L Beasley
(74) *Attorney, Agent, or Firm* — Barnes & Thornburg LLP

(57) ABSTRACT

Technologies for representing alternate reality characters in a real-world environment include receiving sensor data from sensors of a sensor network of a home location of an alternate reality character, determining available response to the stimuli represented by the sensor data, and determining an activity of the alternate reality character for a time period based on the available responses. The technologies may also
(Continued)

include generating a video of the alternate reality character performing the determined activity superimposed on an image map of a real-world environment of the home location during the time period. Users may view the video in real time or during a time period subsequent to the time period represented in the video. Additionally, the alternate reality character may be transferred to remote computing devices in some embodiments.

22 Claims, 6 Drawing Sheets

(51) Int. Cl.
    *H04N 5/222* (2006.01)
    *G06Q 10/10* (2012.01)
    *G06Q 50/00* (2012.01)
    *A63F 13/65* (2014.01)

(52) U.S. Cl.
    CPC ........... *G06T 19/20* (2013.01); *H04N 5/2224* (2013.01); *A63F 13/65* (2014.09); *G06T 2207/10016* (2013.01)

(56) References Cited

U.S. PATENT DOCUMENTS

| | | | | |
|---|---|---|---|---|
| 2008/0015031 A1* | 1/2008 | Koizumi | ............... | A63F 13/06 463/43 |
| 2008/0100704 A1* | 5/2008 | Venetianer | .......... | G06F 17/3079 348/143 |
| 2008/0218331 A1* | 9/2008 | Baillot | ............. | G08B 13/19621 340/521 |
| 2009/0007346 A1* | 1/2009 | Ha | ........................ | D06F 33/02 8/159 |
| 2009/0021585 A1* | 1/2009 | Ko | .................. | G08B 13/19656 348/184 |
| 2009/0069084 A1* | 3/2009 | Reece | .................... | A63F 13/10 463/32 |
| 2010/0043466 A1* | 2/2010 | Oh | ........................ | F25D 23/12 62/125 |
| 2011/0045885 A1* | 2/2011 | Onuki | .................... | A63F 13/00 463/1 |
| 2011/0242134 A1* | 10/2011 | Miller | .................. | G06T 19/006 345/633 |
| 2012/0122570 A1* | 5/2012 | Baronoff | ............... | A63F 13/655 463/31 |
| 2012/0162254 A1 | 6/2012 | Anderson et al. | | |
| 2012/0162255 A1 | 6/2012 | Ganapathy et al. | | |
| 2013/0194278 A1* | 8/2013 | Zajac, III | ............... | A63F 13/10 345/473 |
| 2013/0235045 A1* | 9/2013 | Corazza | .................. | G06T 13/40 345/473 |
| 2013/0293582 A1* | 11/2013 | Ng-Thow-Hing | .... | G06T 19/006 345/633 |
| 2013/0307856 A1* | 11/2013 | Keane | ..................... | G10L 21/10 345/473 |
| 2014/0028850 A1* | 1/2014 | Keating | ................ | G06T 19/006 348/158 |
| 2014/0213361 A1* | 7/2014 | Zhang | ..................... | G06F 3/011 463/31 |
| 2014/0218517 A1* | 8/2014 | Kim | .................... | H04L 12/2818 348/143 |
| 2014/0357366 A1* | 12/2014 | Koganezawa | ........ | G06T 19/006 463/31 |

FOREIGN PATENT DOCUMENTS

| | | | |
|---|---|---|---|
| JP | 2002351972 A | 12/2002 | |
| KR | 1020050121133 A | 12/2005 | |
| KR | 1020110022903 A | 3/2011 | |
| KR | 1020130007079 A | 1/2013 | |
| WO | 2013095393 A1 | 6/2013 | |

OTHER PUBLICATIONS

U.S. Appl. No. 13/851,394, filed Mar. 27, 2013, 44 pages.
"Augmented reality," Wikipedia, The Free Encyclopedia, available: <http://en.wikipedia.org/w/index.php?title=Augmented_reality&oldid=504876185>, edited Jul. 30, 2012, 16 pages.
U.S. Appl. No. 13/631,304, filed Sep. 28, 2012, 42 pages.
Chinese Office Action for Patent Application No. 201380073012.0, dated Aug. 1, 2017, 9 pages.
English Translation of Chinese Office Action for Patent Application No. 201380073012.0, dated Aug. 1, 2017, 15 pages.
Office Action dated Feb. 9, 2018 for Chinese Patent Application No. 201380073012.0, 8 pages.
Decision on Rejection in Chinese Patent Application No. 201380073012.0, dated Sep. 30, 2018, including translation (14 pages).
English Translation of Office Action dated Feb. 9, 2018 for Chinese patent Application No. 201380073012.8, 15 pages.

* cited by examiner

ASYNCHRONOUS REPRESENTATION OF ALTERNATE REALITY CHARACTERS

BACKGROUND

Personal computing devices, including smartphones and tablet computers, are becoming ubiquitous tools for business and personal use. As the processing power of personal computing devices continues to increase, the available interactions and use of such personal computing devices increases likewise. For example, the typical personal computing device is capable executing complex applications and facilitating diverse interactions. One such complex interaction is the generation and interaction with alternate reality characters on the personal computing device.

Alternate reality characters, such as alternate realty pets, are often presented to a user of the personal computing device in real time or near-real time. Typically, the user may view the alternate reality character on a display of the personal computing device by pointing a camera of the computing device toward the location at which the user desires the alternate reality character to appear. The alternate reality character is then added to the streaming real-world video generated by the camera. In many implementations, some type of marker is used to anchor the alternate reality character. Virtual objects may be added with which the alternate reality character may interact to some degree. In some implementations, the alternate reality character may also interact with real-world objects and/or directly with the user in real time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
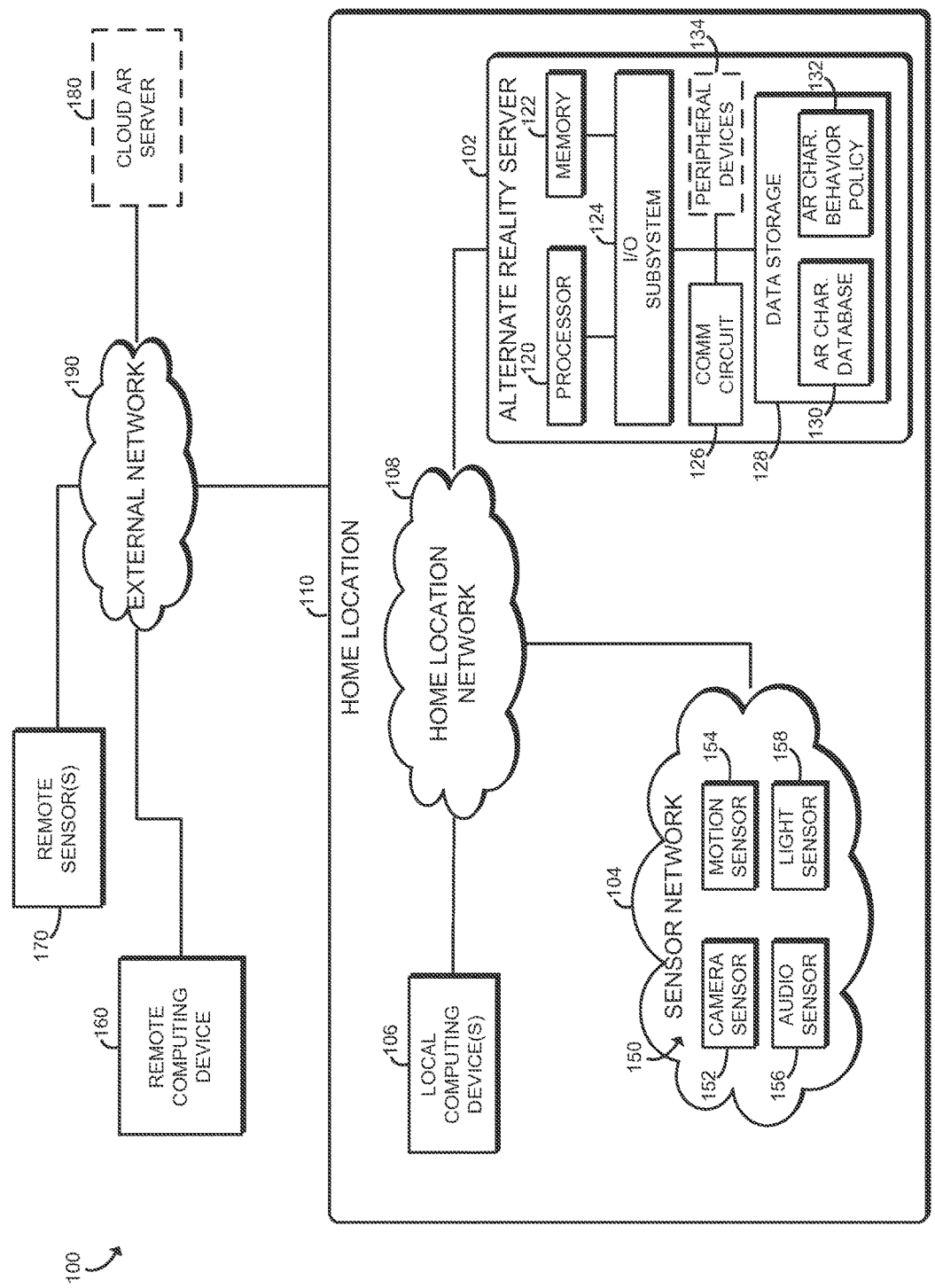
FIG. 1 is a simplified block diagram of at least one embodiment a system for representing alternate reality characters in a real-world environment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for representing alternate reality characters in a real-world environment includes an alternate reality server 102 and a sensor network 104 located in a home location 110. The home location 110 may be embodied as a home residence, a room, an office, a building, or other location from which an image map of the interior environment may be generated as discussed in more detail below. In use, the alternate reality server 102 generates and maintains an alternate reality character (e.g., an alternate reality pet) in the home location 110. By monitoring sensor data received from the sensor network 104 over a home location network 108, the alternate reality server 102 determines activities of the alternate reality character in response to various stimuli experienced by the alternate reality character as represented by the received sensor data. Unlike typical alternate reality characters, the alternate reality server 102 maintains a degree of persistency of the alternate reality character. That is, regardless of whether the "owner" of the alternate reality character (or anyone else) is in the home location and/or currently interacting with the alternate reality character, the alternate reality server 102 continues to monitor the sensor data and determine the activities of the alternate reality character (e.g., the alternate reality character's responses to various stimuli). As such, a user (e.g., the "owner" of the alternate realty character) may review the activities of the alternate reality character asynchronously with regard to the generation of the alternate reality character activities and/or occurrence of the stimuli. For example, the user may review a video of the alternate reality character activities performed earlier in the day upon arriving at the home location 110 (e.g., a child may check to see what adventures the alternate reality character has been on during the day while the child was at school or away from the home location). Of course, the user may also monitor the activities of the alternate reality character in real-time or near real-time. Additionally, in some embodiments, the activities of the alternate reality character may be monitored or reviewed by a computing device remote from the home location 110. Further, in some embodiments, the alternate reality character may travel outside the home location 110 using a mobile computing device as discussed below.

The alternate reality character maintained by the alternate reality server 102 may be embodied as any type of alternate reality character or entity. For example, in some embodiments, the alternate reality character is embodied as a cartoon character such as a cartoon dog, cat, squirrel, monster, or other cartoon character. Of course, the alternate reality character may be embodied as a more "realistic" character (e.g., a doppelganger of the "owner") or as an abstract object, such as a sphere or cube.

The alternate reality server 102 may be embodied as any type of server computer device capable of performing the functions described herein. For example, the alternate reality server 102 may be embodied as a stationary computer, a rack mount computer, a desktop computer, a laptop computer, a table computer, a "smart" appliance, and/or other server computer and/or computing device. As shown in FIG. 1, the illustrative alternate reality server 102 includes a processor 120, a memory 122, an input/output subsystem 124, a communication circuit 126, and a data storage 128. Of course, the alternate reality server 102 may include other or additional components, such as those commonly found in a server computer and/or computing device (e.g., various input/output devices), in other embodiments. Additionally, in some embodiments, one or more of the illustrative components may be incorporated in, or otherwise form a portion of, another component. For example, the memory 122, or portions thereof, may be incorporated in the processor 120 in some embodiments.

The processor 120 may be embodied as any type of processor capable of performing the functions described herein. For example, the processor 120 may be embodied as a single or multi-core processor(s) having one or more processor cores, a digital signal processor, a microcontroller, or other processor or processing/controlling circuit. Similarly, the memory 122 may be embodied as any type of volatile or non-volatile memory or data storage currently known or developed in the future and capable of performing the functions described herein. In operation, the memory 122 may store various data and software used during operation of the alternate reality server 102 such as operating systems, applications, programs, libraries, and drivers.

The memory 122 is communicatively coupled to the processor 120 via the I/O subsystem 124, which may be embodied as circuitry and/or components to facilitate input/output operations with the processor 120, the memory 122, and other components of the alternate reality server 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 122, and other components of the alternate reality server 102, on a single integrated circuit chip.

The communication circuit 126 may be embodied as one or more devices and/or circuitry for enabling communications between the alternate reality server 102 and other computer and/or components of the system 100. The communication circuit 126 may be configured to use any one or more communication technology (e.g., wireless or wired communications) and associated protocols (e.g., Ethernet, Bluetooth®, Wi-Fi®, WiMAX, etc.) to effect such communication.

The data storage 128 may be embodied as any type of device or devices configured for the short-term or long-term storage of data such as, for example, memory devices and circuits, memory cards, hard disk drives, solid-state drives, or other data storage devices. In the illustrative embodiment, the data storage 128 may store an alternate reality character database 130 and an alternate reality character behavior policy 132. The generated and/or available alternate reality characters may be stored in the alternate reality character database 130. Additionally, the generated video of the activities of the corresponding alternate reality characters may be stored in the alternate reality character database 130.

As discussed in more detail below, the alternate reality character(s) maintained by the alternate reality server 102 may perform various activities in response to stimuli represented by the sensor data received from the sensor network 104. The particular activities performed and the particular stimuli to which the alternate reality character responds may be determined based on the alternate reality character behavior policy 132. In the illustrative embodiment, the behavior policy 132 is embodied a set of rules that define the responses of the alternate reality character to various stimuli. Such responses may be simplistic or complex. For example, the particular response of the alternate reality character to any given stimuli may be based on the present stimuli, historical responses, historical stimuli, and/or specific rules set forth in the behavior policy.

In some embodiments, the alternate reality server 102 may further include one or more peripheral devices 134. Such peripheral devices 134 may include any type of peripheral device commonly found in a server or computing device such as other data storage devices, speakers, a hardware keyboard, input/output devices, peripheral communication devices, and/or other peripheral devices.

The sensor network 104 is embodied as a collection of sensors 150 located in the home location 110. The sensors 150 may include one or more sensors of any type capable of generating sensor data indicative of a particular stimulus to which the alternate reality character may respond. For example, in some embodiments, the sensors 150 includes one or more camera sensors 152, one or more motion sensors 154, one or more audio sensors 156, and/or one or more light sensors 158. Of course, in other embodiments, the sensors 150 may include additional or other sensors capable of generating suitable sensor data.

The camera sensors 152 may be embodied as, or otherwise include, any type of cameras or devices capable of generating images and/or video. For example, the camera sensors 152 may include cameras configured for standard light, low-light, and/or nighttime vision. The camera sensors 152 may be located throughout the home location 110 to facilitate the generation of the image map of the environment of the home location 110, as well as capturing activity within the home location 110 (e.g., people walking about the home location 110).

The motion sensors 154 may be embodied as, or otherwise include, any type of motion sensor capable of generating sensor data indicative of movement within a monitored zone or particular area of the home location. In some embodiments, one or more of the motion sensors 154 may be communicatively coupled to other sensors 150, such as a camera sensor 152, to cause activation of the other sensor 150 in response to detected motion within the monitored zone or area.

The audio sensors 156 may be embodied as, or otherwise include, any type of audio sensor capable of generating audio data indicative of audible content within the home location 110 including, but not limited to, background noise, verbal commands from persons inside the home location 110, conversations, and other audible content within the home location 110.

The light sensors 158 may be embodied as, or otherwise include, any type of light sensor capable of generating sensor data indicative of the presence or absence of light within a particular monitored zone or area of the home location 110. For example, the light sensors 158 may detect whether a person has turned on or off a light. As with the motion sensors 154, the light sensors 158 may be communicatively coupled to other sensors 150, such as a camera sensor 152, to cause activation of the other sensor 150 in response to the detection of the presence of light, or absence thereof, in the monitored zone.

Each of the sensors 150 of the sensor network 104 is configured to transfer the sensor data generated therefrom to the alternate reality server 102 over the home location network 108. The home location network 108 may be embodied as any type of wired and/or wireless network capable of facilitating communications between the sensor network 104 and the alternate reality server 102, as well as other computer devices of the system 100. In the illustrative embodiment, the network 108 is embodied as a local area network and may use any suitable wireless and/or wired communication technology and/or protocol. Of course, the network 108 may include additional devices, which are not shown in FIG. 1, to facilitate communications across the network 108 including but not limited to access points, routers, switches, intervening computers, and/or the like.

In some embodiments, the home location 110 may also include one or more local computing devices 106. Each local computing device 106 may be embodied as any type of computing device capable of communicating with the alternate reality server 102 over the home location network 108 and performing the functions described herein. For example, the local computing device 106 may be embodied as a "smart" phone, a cell phone, a tablet computer, a laptop computer, a desktop computer, a personal digital assistant, a mobile or stationary media device, a game console, a mobile internet device (MID), a smart appliance device, or other mobile or stationary computing device. The local computing device 106 may include components similar to the alternate reality server 102 and/or typical computing devices, such as a processor, memory, display, communication circuit, data storage, and/or the like. Those components of the local computing device 106 may be similar to the corresponding components of the alternate reality server 102, the description of which is applicable to the corresponding components of the local computing device 106 and is not repeated herein for clarity of the description.

As discussed in more detail below, the local computing device 106 may communicate with the alternate reality server 102 to view, asynchronously or in real-time, the video of the alternate reality character's activities generated by the alternate reality server 102. Additionally, in some embodiments, the local computing device 106 may temporarily receive the alternate reality character from the alternate reality server 102. In such embodiments, the local computing device 106 may travel from the home location 110 to allow the alternate reality character to experience stimuli outside of the home location 110 as discussed in more detail below.

The system 100 may also include one or more remote computing devices 160. Each remote computing device 160 may be embodied as any type of computing device capable of communicating with the alternate reality server 102 over an external network 190 and performing the functions described herein. For example, the remote computing device 160 may be embodied as a "smart" phone, a cell phone, a tablet computer, a laptop computer, a desktop computer, a personal digital assistant, a mobile or stationary media device, a game console, a mobile internet device (MID), a smart appliance device, or other mobile or stationary computing device. The remote computing device 160 may include components similar to the alternate reality server 102 and/or typical computing devices, such as a processor, memory, display, communication circuit, data storage, and/or the like. Those components of the remote computing device 160 may be similar to the corresponding components of the alternate reality server 102, the description of which is applicable to the corresponding components of the remote computing device 160 and is not repeated herein for clarity of the description.

Similar to the local computing device 106, a user of the remote computing device 160 may communicate with the alternate reality server 102 over the external network 190 to view, asynchronously or in real-time, the video of the alternate reality character's activities generated by the alternate reality server 102. The external network 190 may be embodied as any number of various wired and/or wireless data communication networks. For example, the external network 190 may be embodied as or otherwise include a local area network (LAN), a wide area network (WAN), or a publicly accessible, global network such as the Internet. The external network 190 may use any suitable wireless and/or wired communication technology and/or protocol to facilitate communications between the various components of the system 100. The external network 190 may include additional devices, which are not shown in FIG. 1, to facilitate such communications including, but not limited to, routers, switches, intervening computers, and/or the like.

The system 100 may also include one or more remote sensors 170. The remote sensors 170 may be similar to the sensors 150 and may be embodied as one or more sensors of any type capable of generating sensor data indicative of a particular stimulus to which the alternate reality character may respond. For example, in some embodiments, the sensors 170 may include environmental sensors (e.g., weather sensors) capable of generating data indicative of the local weather or environment of the home location 110. Additionally, in some embodiments, the remote sensors 170 may include computing devices capable of generating appropriate sensor data. Further, in embodiments in which the alternate reality character has been transferred to a local computing device 106 or a remote computing device 106, the remote sensors 170 may be configured to transmit the sensor data to the computing device 106, 160 on which the alternate reality character is currently residing to allow the alternate reality character to respond to such stimuli as discussed in more detail below.

In some embodiments, the alternate reality server 102 may be embodied as a cloud alternate reality server 180. In such embodiments, rather than being located in the home location 110, the cloud alternate reality server 180 is remote to the home location 110. In such embodiments, the cloud alternate reality server 180 performs all of the functions of the alternate reality server 102 but does so via the external network 190. For example, in such embodiments, the sensor network 104 is configured to transmit the sensor data generated by the sensors 150 to the cloud alternate reality server 180 over the external network 190. Additionally, the local computing device 106 may access the cloud alternate reality server 180 to review the video of the alternate reality character activities as discussed above with regard the alternate reality server 102.

Figure 2:
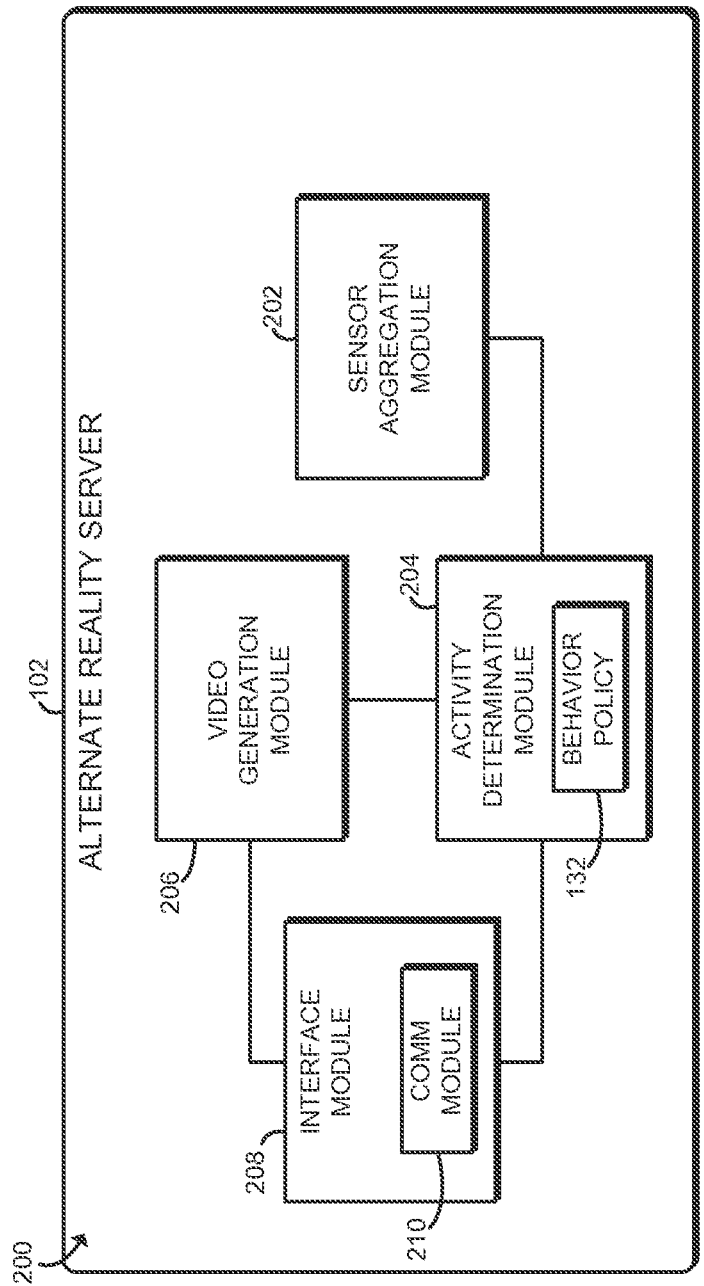
FIG. 2 is a simplified block diagram of at least one embodiment of an environment of an alternate reality server of the system of FIG. 1.

Referring now to FIG. 2, in the illustrative embodiment, the alternate reality server 102 establishes an environment 200 during operation. The illustrative environment 200 includes a sensor aggregation module 202, an activity determination module 204, a video generation module 206, and an interface module 208, each of which may be embodied as software, firmware, hardware, or a combination thereof.

The sensor aggregation module 202 receives the sensor data from each of the sensors 150 of the sensor network 104. The sensor aggregation module 202 aggregates the received sensor data and presents the aggregated sensor data to the activity determination module 204. In some embodiments, the sensor aggregation module 202 may collect the sensor data over a defined time period and present the sensor data to the activity determination module 204 periodically. Alternatively, in other embodiments, the sensor aggregation module 202 may present the sensor data to the activity determination module 204 in real-time or near real-time. Additionally, in some embodiments, the sensor aggregation module 202 may apply a type of data conditioning, such as quantization, to the sensor data to prepare it for analysis by the activity determination module 204.

The activity determination module 204 receives the sensor data from the sensor aggregation module 202 and determines available responses of the alternate reality character to the stimuli represented by the sensor data. In some embodiments, each piece of sensor data may represent an individual stimulus to which the alternate reality character may respond. Alternatively, in some embodiments, multiple pieces of sensor data may be associated with each other to produce the stimulus to which the alternate reality character may respond. Regardless, the activity determination module 204 may compare the stimuli (or the sensor data itself) to the behavior policy 132 to determine the available responses of the alternate reality character. As many different stimuli may be available during any particular time period, the alternate reality character may be presented with multiple response choices for each analyzed time period. As such, the activity determination module 204 may also determine the alternate reality character's activity for the particular time period based on the available responses to the stimuli represented by the sensor data. For example, the activity determination module 204 may select one or more of the available responses to generate the activity for the alternate reality character for the current time period. Such selection may be based on the available responses, historic data indicative of the alternate reality character's previous activities and/or responses, the behavior policy 132, and/or other criteria. In some embodiments, the activity determination module 204 may select no activity for the alternate reality character if no stimulus has been received or if the determined activity is below a reference activity threshold (e.g., it's nighttime and alternate reality character "owner" is asleep). In this way, time periods of dull or little activity of the alternate reality character may be skipped or automatically played back in a high-speed time sequence with a visual representation of passing time, such as a virtual digital clock.

After the alternate reality character's activity for the current time period has been selected or otherwise determined, the activity determination module 204 presents the selected alternate reality character's activity for the current time period to the video generation module 206. The video generation module 206 generates a video of the alternate reality character performing the selected activity, which is superimposed over the image map of the environment of the home location 110. For example, the alternate reality character may be shown dancing on a countertop, interacting with a family pet, eating food from an unattended dinner plate, and/or other activities. As discussed above, the generation of the video of the alternate reality character's activities may be done asynchronously to the viewing of such video. As such, even while the "owner" of the alternate reality character or other members of the home location 110 are away, the activities of the alternate reality character may be generated and monitored by the alternate reality server 102 and subsequently viewed by the members of the home location 110.

The interface module 208 facilitates interactions with the alternate reality character and access of the generated video. For example, a user of the local computing device 106 and/or a user of the remote computing device 160 may interact with the alternate reality character via the interface module 208. To do so, the users of the computing devices 106, 160 may submit commands to the alternate reality character via a communication module 210 of the interface module 208. Such commands or other interactions are provided to the activity determination module 204 as additional stimuli by the interface module 208. Alternatively, the users of the computing devices 106, 160 may view the previously generated video, or real-time video, of the alternate reality character's activities via the interface module 208. In such embodiments, the interface module 208 may communicate with the video generation module 206 to generate, or otherwise retrieve, the desired video.

Figure 3:
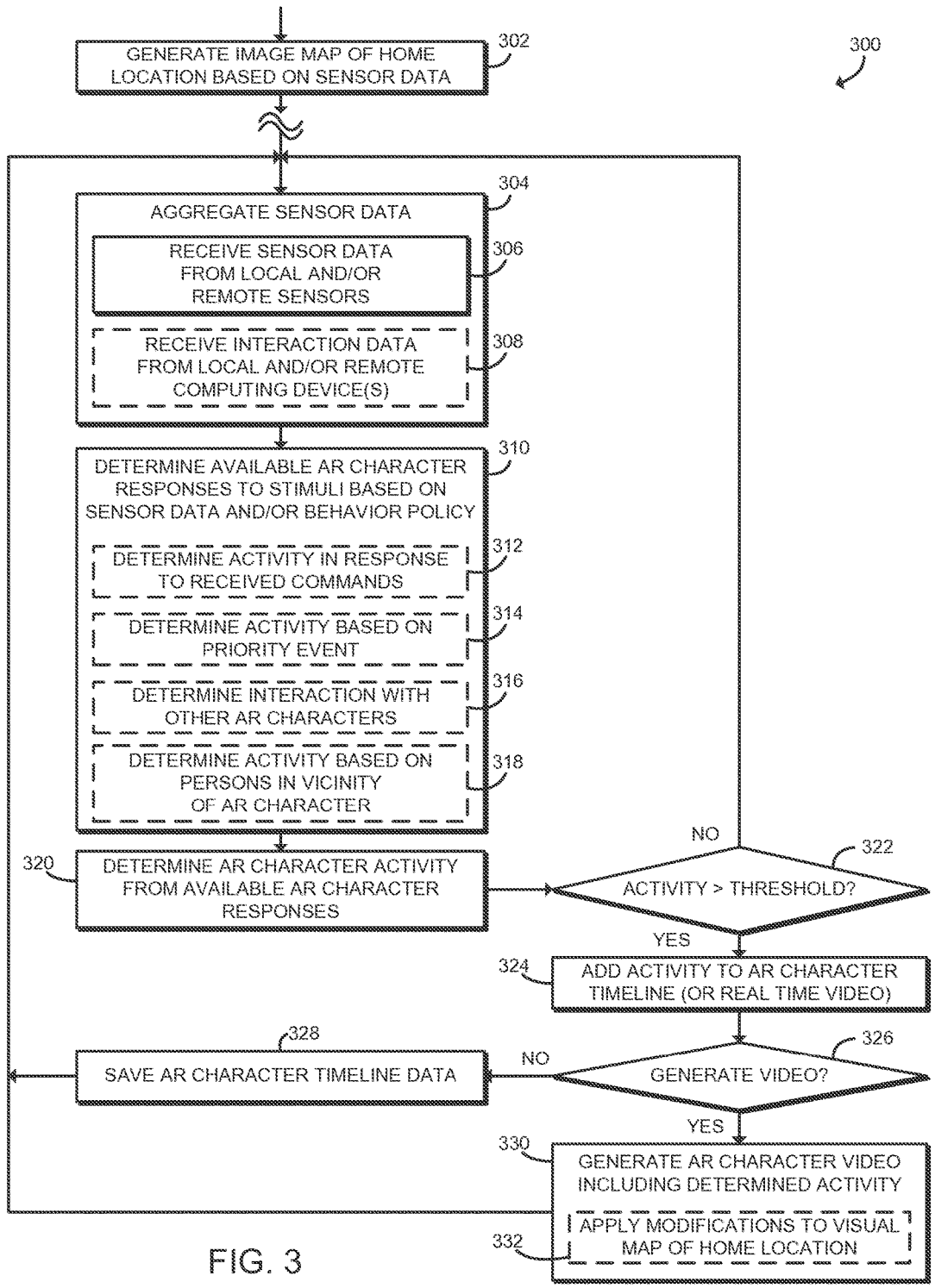
FIG. 3 is a simplified flow diagram of at least one embodiment of a method for representing an alternate reality character in an environment.

Referring now to FIG. 3 in use, the alternate reality server 102 may execute a method 300 for representing an alternate reality character in an environment. The method 300 begins with block 302 in which the alternate reality server 102 generates an image map of the environment of the home location 110. To do so, the alternate reality server 102 may capture images produced by the camera sensors 152 of the sensor network 104 to piece together an image map of the home location 110. As the environment of the home location 110 typically does not change, the generation of the image map may need to be performed only once at the initiation of the system 100. Alternatively, in other embodiments, the image map of the environment of the home location 110 is generated periodically or in response to detection of a change in the local environment (e.g., movement of furniture). The image map may be embodied as separate, individual still images, a collection of images, or as video of the environment of the home location 110.

After the image map has been generated, the method 300 advances to block 304 in which the alternate reality server 102 receives and aggregates sensor data. For example, in block 306, the alternate reality server 102 receives the sensor data from the sensors 150 of the sensor network 104. Additionally or alternatively, the alternate reality server 102 may receive sensor data from one or more of the remote sensors 170, such as a weather data from a weather sensor remote from the home location 110. As discussed above, the sensor data may be embodied as any type of data capable of representing a stimulus from which a response by the alternate reality character may be determined. In some embodiments, the alternate reality server 102 may also receive interaction data from the local computing device 106 and/or the remote computing device 160 indicative of interactions with the alternate reality character by the users of the devices 106, 160 in block 308.

In block 310, the alternate reality server 102 determines the available responses to the stimuli represented by the received sensor data. To do so, in some embodiments, the alternate reality server 102 compares the sensor data (or the stimuli determined from the sensor data) to the alternate reality character behavior policy 132. Depending on the volume of sensor data and corresponding stimuli, the alternate reality server 102 may determine any number of available responses by the alternate reality character. For example, in block 312, the alternate reality server 102 may determine a response of the alternate reality character to commands or other interactions with the alternate reality character by a user of the local computing device 106 and/or the remote computing device 160.

Additionally or alternatively, the alternate reality server 102 may determine a response of the alternate reality character to a priority event in block 314. Such a priority event may be defined, for example, in the alternate reality character behavior policy 132 and may be embodied as any type of event having an importance relative to other stimuli. For example, detection of an intruder to the home location 110, a fire in the home location 110, a light that has been left on, or other important event may be determined to be a priority event, and the alternate reality server 102 may determine an appropriate response of the alternate reality character to such event.

In block 316, the alternate reality server 102 may determine a response of the alternate reality character to interactions by or with other alternate reality characters maintained by the alternate reality server 102. For example, multiple alternate reality characters may group up to perform particular activities (e.g., chase the family dog). Additionally or alternatively, in block 318, the alternate reality server 102 may determine responses of the alternate reality character to the presence of persons in the vicinity of the alternate reality character. In such embodiments, the alternate reality server 102 may utilize a facial recognition algorithm to identity the user such that the responses of the alternate reality character may be customized to the particular person present. Of course, it should be appreciated that the alternate reality server 102 may determine any number of additional or other available responses by the alternate reality character to the same or other stimulus in other embodiments.

In block 320, the alternate reality server 102 determines an activity for the alternate reality character based on the available responses determined in block 310. As discussed above, the alternate reality server 102 may select the activity or activities based on the available responses and the alternate reality character behavior policy 132. Iii block 322, the alternate reality server 102 determines whether the selected or determined activity of the alternate reality character is above a reference activity threshold. For example, in periods of little sensor data or stimulus, the alternate reality server 102 may determine that the selected alternate reality character activity is too dull or minor in nature. If so, the method 300 loops back to block 304 to continue the aggregation of sensor data. In this way, dull periods of the alternate reality character's activity may be skipped or minimized.

If, however, the determined activity of the alternate reality character is greater than the reference activity threshold, the method 300 advances to block 324 in which the determined activity is added to the timeline of activities of the alternate reality character or, if the video is being watched in real-time, to the real-time video stream. Subsequently, in block 326, the alternate reality server 102 determines whether to generate the video of the alternate reality character's activities. For example, the alternate reality server 102 may be configured to generate video continuously, periodically, or only in response to a request for the video. That is, the video may be pre-generated or generated upon request even when accessed asynchronously. If the alternate reality server 102 is not configured to generate the video at the current time, the method 300 advances to block 328 in which the alternate reality character timeline data (e.g., the alternate reality character activities) are saved in the data storage 128. In this way, the video of the alternate reality characters activities may be generated upon request at a later time.

Figure 6:
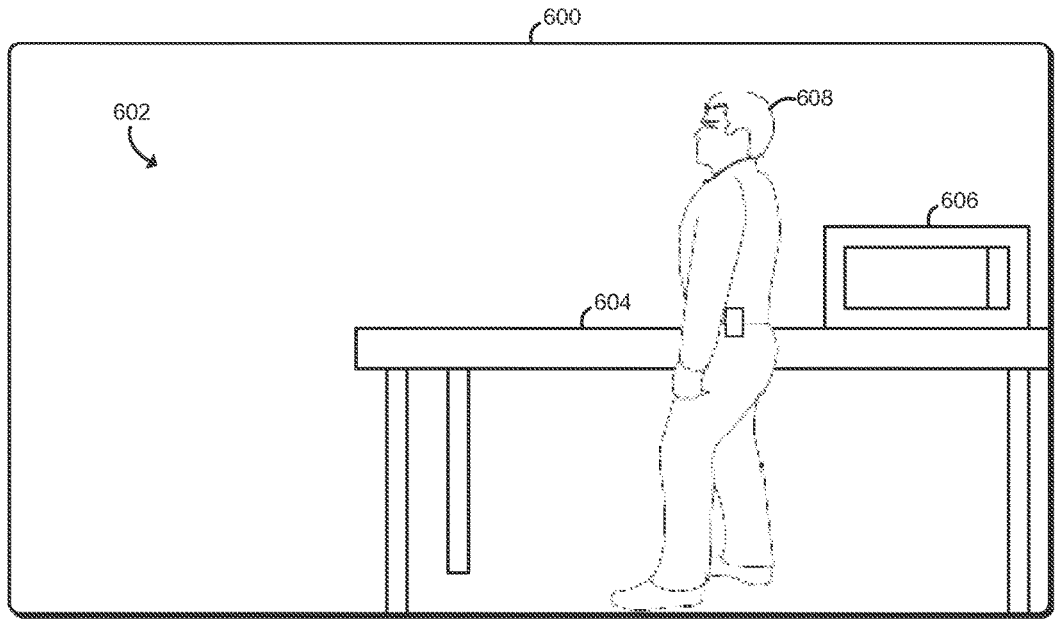
FIG. 6 is a simplified illustration of a real time video of a real-world environment.
Figure 7:
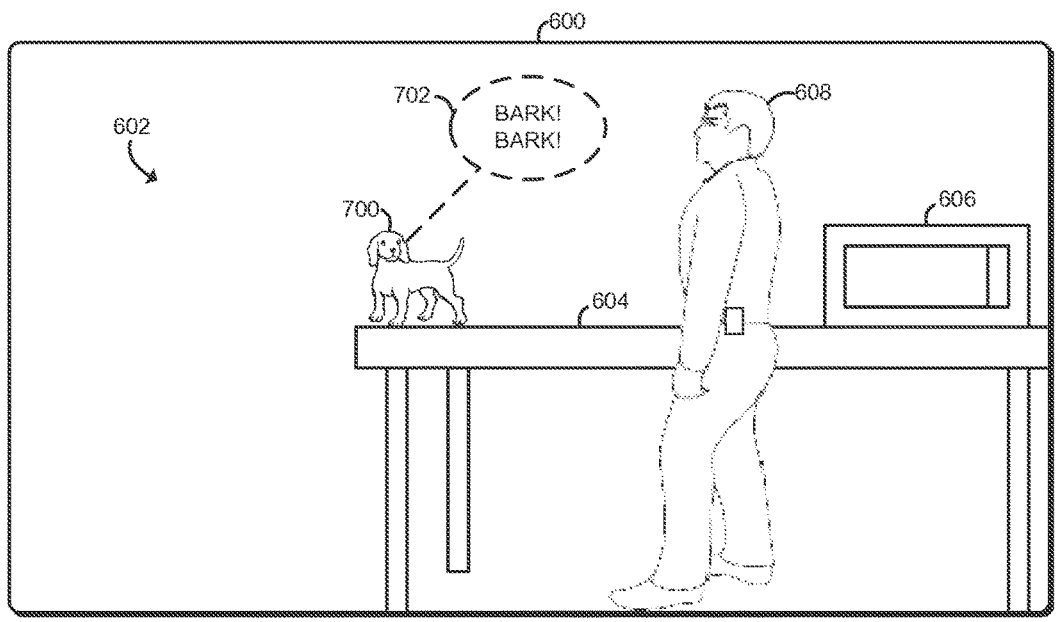
FIG. 7 is a simplified illustration of a video representation of an alternate reality character presented in the environment of the real time video of FIG. 6.

If, however, the alternate reality server 102 is configured to generate the video, the method 300 advances to block 330 in which the alternate reality server 102 generates the video of the alternate reality character performing the determined activity. As discussed above, the alternate reality character is superimposed on the image map of the environment of the home location 110. For example, a current image map 600 of an environment 602 of the home location 110 is shown in FIG. 6. The environment 602 includes a table 604 and an appliance 606. Additionally, at the present time, a person 608 has walked up to the table 604. Based on the presence of the person 608, the alternate reality server 102 may determine an activity of an alternate reality character 700. For example, a generated video image of an activity 702 of the alternate reality character 700, illustratively a cartoon dog, is shown in FIG. 7. The alternate reality character 700 is shown standing atop the table 604 with a "barking" activity 702 toward the person 608, who may be, for example, the "owner" of the alternate reality character 700. In this way, the alternate reality server 102 determines activities of the alternate reality character to stimulus presented to the alternate reality character and generates video of such activities.

Referring back to FIG. 3, in some embodiments, the alternate reality server 102 may also apply a modification to the image map of the environment of the home location 110 in block 322. For example, the alternate reality server 102 may change the time of day, change a color in the image map, remove items from the image map, add virtual items to the image map, and/or perform additional or other modifications to the image map of the local environment of the home location 110. After the video of the alternate reality character's activity has been generated, the method 300 loops back to block 304 to continue aggregating sensor data.

Figure 4:
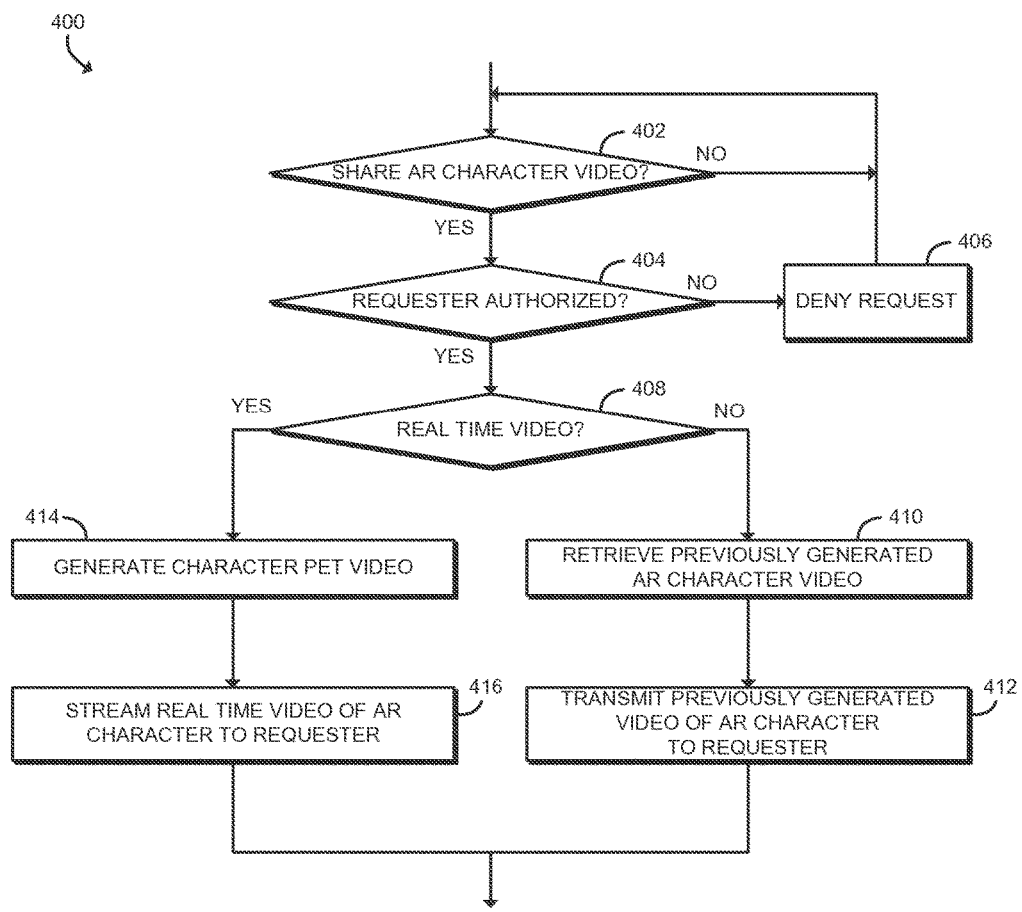
FIG. 4 is a simplified flow diagram of at feast one embodiment of a method for sharing the representation of the alternate reality character.

Referring now to FIG. 4 as discussed above, the video of the alternate reality character's activities may be shared with local computing devices 106 and/or remote computing device 160. To do so, the alternate reality server 102 may execute a method 400 for sharing the representation of the alternate reality character. The method 400 begins with block 402 in which the alternate reality server 102 determines whether a request for the video of the alternate reality character's activities has been received. If so, in block 404, the alternate reality server 102 determines whether the requester is authorized to receive or view the video. If not, the request is denied in block 406. If, however, the requester is authorized to view the video of the alternate reality character's activities, the method 400 advances to block 408 in which the alternate reality server 102 determines whether the requester is requesting to view real-time video or previously generated video (i.e., asynchronous viewing). If the requester desires to view previously generated video of the alternate reality character's activities, the method 400 advances to block 410 in which the alternate reality server 102 retrieves the previously generated video. In some embodiments, the user of the devices 106, 160 may be presented with a user interface or other mechanism from which the requester may select the particular video or time period of interest. Subsequently, in block 412, the retrieved video is transmitted to the requester's computing device 106, 160. In some embodiments, the alternate reality server 102 facilitates control of the playback of the retrieved video by the requester (e.g., fast-forwarding, rewinding, high speed, slow motion, skipping, etc.)

Referring back to block 408, if the requester desires to view real-time video of the alternate reality character's activities, the method 400 advances to block 414 in which the real-time video is generated. To do so, the alternate reality server 102 may execute the method 300 discussed above to retrieve sensor data, determine the alternate reality character's activities in response to stimuli represented by the sensor data, and generate the real-time video of the determined alternate reality character's activities superimposed on the image map of the environment of the home location 110. Subsequently, in block 416, the alternate reality server 102 streams the real time video of the alternate reality character's activities to the requester. In this way, a user of the local computing device 106 and/or a user of the remote computing device 160 may interact with the alternate reality server 102 to review previously generated, or real-time, video of the alternate reality character's activities.

Figure 5:
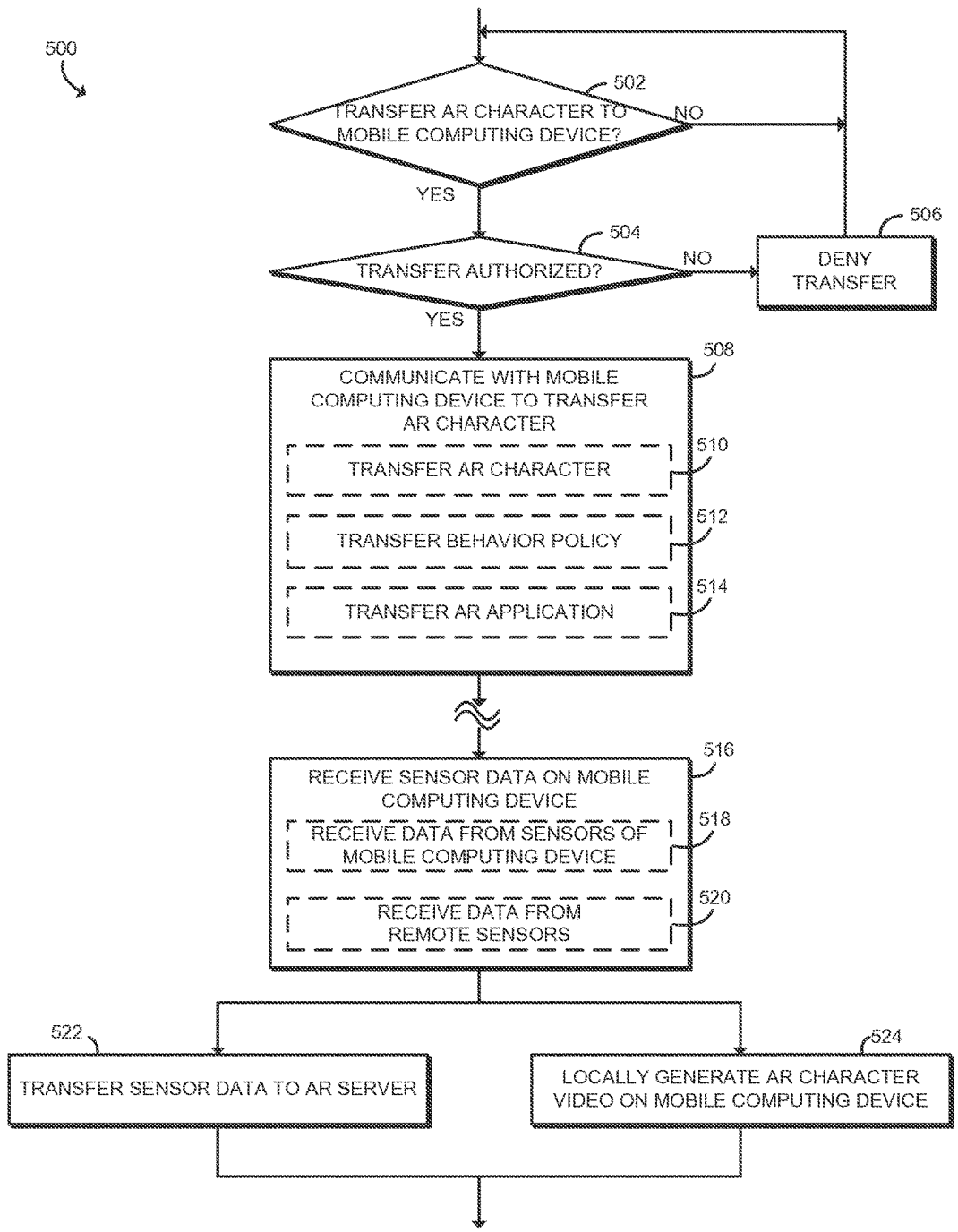
FIG. 5 is a simplified flow diagram of at least one embodiment of a method for transferring the alternate reality character to another computing device.

Referring now to FIG. 5, as discussed above, the alternate reality character may be transferred from the alternate reality server 102 to other computing devices, such as a mobile computing device (e.g., a mobile local computing device 106). To do so, the alternate reality server 102 may execute a method 500 for transferring the alternate reality character to another computing device. The method 500 begins with block 502 in which the alternate reality server 102 determines whether a request for such a transfer has been received. For example, a user of the local or remote computing devices 106, 160 may interface with the alternate reality server 102 via the network 108 and/or network 190 to request transfer of the alternate reality character. If so, the method 500 advances to block 504 in which the alternate reality server 102 determines whether the requester is authorized to receive the alternate reality character. For example, the alternate reality server 102 may require a password or implement other security measures to ensure the requester is authorized to transfer the alternate reality character (i.e., an "owner" of the alternate reality character to protect such transfers by enabling password protection or the like). If the requester is not authorized, the method 500 advances to block 506 in which the alternate reality server 102 denies the transfer request.

If, however, the requester is authorized to receive the alternate reality character, the method 500 advances to block 508 in which the alternate reality server 102 transfers the alternate reality character to the requester's computing device 106, 160. To do so, the alternate reality server 102 may transfer the alternate reality character in block 510. That is, the alternate reality server 102 may transfer the rendered model, images, or other visual data required to reproduce the alternate reality character on the requester's computing device 106, 160 in block 510. Additionally, in some embodiments, the alternate reality server 102 may transfer the alternate reality character behavior policy 132, or portion thereof, to the requester's computing device 106, 160. By having a local copy of the alternate reality character behavior policy 132, the requester's computing device 106, 160 may locally determine the responses and activities of the alternate reality character as discussed below. Additionally, in some embodiments, the alternate reality server 102 may transfer an alternate reality software application or other software to the requester's computing device 106, 160 to facilitate the generation and management of the alternate reality character on the requester's computing device 106, 160. For example, the alternate reality server 102 may transfer an alternate reality character generation software that facilities the user of the requester's computing device 106, 160 to view locally view the alternate reality character superimposed on the local environment, as well as determine the activities of the alternate reality character in response to local stimuli as discussed below.

After the requester's computing device 106, 160 has received the alternate reality character from the alternate reality server 102, the user of the computing device 106, 160 may travel about (e.g., away from the home location 110) and take the alternate reality character along. In some embodiments, the user of the requester's computing device 106, 160 may view the activities of the alternate reality character to local stimuli using the requester's computing device 106, 160 on which the alternate reality character is currently residing. As such, in block 516, the computing device 106, 160 may receive sensor data directly on the computing device 106, 160. For example, in block 518, the computing device 106, 160 receives sensor data from one or more sensors included in the computing device 106, 160. Such sensors may be embodied as any type of sensor included in the computing device 106, 160 and capable of generating sensor data to which the alternate reality character may respond including, but not limited to, a computer camera, a computer microphone, an accelerometer sensor, an attitude sensor, an environment sensor, a motion sensor, a light sensor, and/or other sensors. Additionally or alternatively, the computing device 106, 160 may receive sensor data from one or more of the remote sensors 170 in block 520.

The determination of the alternate reality character's activities to the stimuli represented by the sensor data received in block 516 and the video of such activities may be performed on the alternate reality server 102 or locally on the computing device 106, 160 in some embodiments. As such, in block 522, the computing device 106, 160 may transmit the sensor data received in block 516 to the alternate reality server 102 for use in determining the alternate reality character's activities and generating the resulting video, which may be subsequently transmitted back to computing device 106, 160. Alternatively, the computing device 106, 160 may locally generate the video of the alternate reality characters activities in block 524 using the corresponding video generation method discussed above in regard to blocks 304-332 of the method 300.

EXAMPLES

Illustrative examples of the technologies disclosed herein are provided below. An embodiment of the technologies may include any one or more, and any combination of, the examples described below.

Example 1 includes an alternate reality server to represent alternate reality characters in a real-world environment, the alternate reality server comprising a sensor aggregation module to (i) generate an image map of a real-world environment of a home location of an alternate reality character and (ii) receive sensor data from a plurality of sensors of a sensor network of the home location; an activity determination module to (i) determine available responses of the alternate reality character to stimuli represented by the sensor data and (ii) determine an activity of the alternate reality character for a first time period based on the available responses; and a video generation module to generate a video of the alternate reality character performing the determined activity superimposed on the image map of the real-world environment of the home location during the first time period.

Example 2 includes the subject matter of Example 1, and further including an interface module to transmit the video of the alternate reality character to a computing device for playback thereon at a second time period subsequent to the first time period.

Example 3 includes the subject matter of any of Examples 1 and 2, and wherein the sensor aggregation module is to generate the image map of the real-world environment using cameras of the sensor network.

Example 4 includes the subject matter of any of Examples 1-3, and wherein the sensor data comprises image data generated by a camera sensor of the sensor network.

Example 5 includes the subject matter of any of Examples 1-4, and wherein the sensor data comprises motion data generated by a motion sensor of the sensor network.

Example 6 includes the subject matter of any of Examples 1-5, and wherein the sensor data comprises audio data generated by an audio sensor of the sensor network.

Example 7 includes the subject matter of any of Examples 1-6, and wherein the sensor data comprises sensor data generated by a light sensor of the sensor network.

Example 8 includes the subject matter of any of Examples 1-7, and wherein the sensor aggregation module is further to receive sensor data from a sensor remote from the home location.

Example 9 includes the subject matter of any of Examples 1-8, and further including a database having stored therein a behavior policy that correlates a behavior of the alternate reality character to corresponding stimuli, and wherein the activity determination module is to determine the available responses of the alternate reality character to the stimuli based on the behavior policy.

Example 10 includes the subject matter of any of Examples 1-9, and wherein the sensor data comprises data indicative of a remote user's interaction with the alternate reality character, and wherein the activity determination module is to determine the available responses the alternate reality character to the remote user's interaction.

Example 11 includes the subject matter of any of Examples 1-10, and wherein the sensor data comprises interaction data indicative of an interaction with the alternate reality character by another alternate reality character, and wherein the activity determination module is to determine the available responses of the alternate reality character to the interaction from the another alternate reality character.

Example 12 includes the subject matter of any of Examples 1-11, and wherein the sensor data comprises event data indicative of a priority event occurring in the home location, and wherein the activity determination module is to determine the available responses of the alternate reality character to the priority even based on the event data.

Example 13 includes the subject matter of any of Examples 1-12, and wherein the sensor data comprises a command received from a remote computing device, and wherein the activity determination module is to determine the available responses of the alternate reality character to the received command.

Example 14 includes the subject matter of any of Examples 1-13 and wherein the sensor data comprises video data indicative of the presence of a person in the home location, and wherein the activity determination module is to (i) determine an identity of the person and (ii) determine a response of the alternative reality character based on the identity of the person.

Example 15 includes the subject matter of any of Examples 1-14, and wherein the sensor data comprises environmental data indicative of an environmental condition at the home location, and wherein the activity determination module is to determine a response of the alternative reality character based on the determined environmental condition.

Example 16 includes the subject matter of any of Examples 1-15, and wherein to determine the activity of the alternate reality character comprises to select one response of the available responses based on a behavior policy associated with the alternate character.

Example 17 includes the subject matter of any of Examples 1-16, and whereas the activity determination module is further to determine whether the determined activity is greater than a threshold measurement of activity; and skip the current time period in response to the determined activity being less than the threshold measurement of activity.

Example 18 includes the subject matter of any of Examples 1-17, and wherein the activity determination module is further to generate a video of the alternate reality character performing an additional activity superimposed on the image map of the real-world environment of the home location during a second time period subsequent to the first time period; and append the video of the second time period to the first time period to generate a video timeline of activity of the alternate character.

Example 19 includes the subject matter of any of Examples 1-18, and further including an interface module to receive, subsequent to the first time period, a request for the generated video from a computing device; and transmit the generated video to the computing device in response to the request.

Example 20, includes the subject matter of any of Examiners 1-19, and wherein the interface module is further to respond to commands from the computer device to control playback of the generated video.

Example 21 includes the subject matter of any of Examples 1-20, and wherein the activity determination module is further to modify the image map of the real-word environment, and generate the video of the alternate reality character performing the determined activity superimposed on the modified image map of the real-world environment of the home location during the first time period.

Example 22 includes the subject matter of any of Examples 1-21, and further including an interface module to receive a request from a computing device for a real time video of the activity of the alternate character, and wherein the activity determination module is further to generate a real time video of the alternate reality character performing the determined activity superimposed on the image map of the real-world environment of the home location, and wherein the interface module is further to steam the real time video to the computing device.

Example 23 includes the subject matter of any of Examples 1-22, and further including an interface module to receive, from a mobile computing device, a request to transfer the alternate character to the mobile computing device; and transfer the alternate character to the mobile computing device in response to the request.

Example 24 includes the subject matter of any of Examples 1-23, and wherein to transfer the alternate character comprises to transfer a behavior policy that correlates a behavior of the alternate reality character to corresponding stimuli.

Example 25 includes the subject matter of any of Examples 1-24, and wherein to transfer the alternate character comprises to transfer an alternate reality application that instantiates the alternate reality character on the mobile computing device.

Example 26 includes the subject matter of any of Examples 1-25, and wherein face module is to receive sensor data from the mobile computing device while the alternate character is transferred thereto; and the video generation module is to generate the video of the alternate reality character based on the sensor data received from the mobile computing device.

Example 27 includes the subject matter of any of Examples 1-26, and wherein the interface module is to transfer the video generated based on the sensor data received from the mobile computing device to the mobile computing device.

Example 28 includes a method for representing alternate reality characters in a real-world environment, the method comprising generating, on an alternate reality server, an image map of a real-world environment of a home location of an alternate reality character; receiving, on the alternate reality server, sensor data from a plurality of sensors of a sensor network of the home location; determining, on the alternate reality server, available responses of the alternate reality character to stimuli represented by the sensor data; determining, on the alternate reality server, an activity of the alternate reality character for a first time period based on the available responses; and generating, on the alternate reality server, a video of the alternate reality character performing the determined activity superimposed on the image map of the real-world environment of the home location during the first time period.

Example 29 includes the subject matter of Example 28, and further including transmitting the video of the alternate reality character to a computing device for playback thereon at a second time period subsequent to the first time period.

Example 30 includes the subject matter of any of Examples 28 and 29, and wherein generating the image map comprises generating the image map of the real-world environment using cameras of the sensor network.

Example 31 includes the subject matter of any of Examples 28-30, and wherein receiving the sensor data comprises receiving image data generated by a camera sensor of the sensor network.

Example 32 includes the subject matter of any of Examples 28-31, and wherein receiving the sensor data comprises receiving motion data generated by a motion sensor of the sensor network.

Example 33 includes the subject matter of any of Examples 28-32, and wherein receiving the sensor data comprises receiving audio data generated by an audio sensor of the sensor network.

Example 34 includes the subject matter of any of Examples 28-33, and wherein receiving the sensor data comprises receiving sensor data generated by a light sensor of the sensor network.

Example 35 includes the subject matter of any of Examples 28-34, and further including receiving sensor data from a sensor remote from the home location.

Example 36 includes the subject matter of any of Examples 28-35, and wherein determining the available responses comprises determining available responses of the alternate reality character to the stimuli based on a behavior policy stored on the alternate reality server that correlates a behavior of the alternate reality character to corresponding stimuli.

Example 37 includes the subject matter of any of Examples 28-36, and wherein receiving sensor data comprises receiving data indicative of a remote user's interaction with the alternate reality character, and determining the available responses comprises determining a response of the alternate reality character to the remote user's interaction.

Example 38 includes the subject matter of any of Examples 28-37, and wherein receiving sensor data comprises receiving interaction data indicative of an interaction with the alternate reality character from another alternate reality character, and determining the available responses comprises determining a response of the alternate reality character to the interaction from the another alternate reality character.

Example 39 includes the subject matter of any of Examples 28-38, and wherein receiving sensor data comprises receiving event data indicative of a priority event occurring in the home location, and determining available responses comprises determining a response of the alternative reality character to the priority even based on the event data.

Example 40 includes the subject flatter of any of Examples 28-39, and wherein receiving sensor data comprises receiving a command from a remote computing device, and determining available responses comprises determining a response of the alternative reality character to the received command.

Example 41 includes the subject matter of any of Examples 28-40, and wherein receiving sensor data comprises receiving video data indicative of the presence of a person in the borne location, and determining available responses comprises (i) determining an identity of the person and (ii) determining a response of the alternative reality character based on the identity of the person.

Example 42 includes the subject matter of any of Examples 28-41, and wherein receiving sensor data comprises receiving environmental data indicative of an environmental condition at the home location, and determining available responses comprises determining a response of the alternative reality character based on the determined environmental condition.

Example 43 includes the subject matter of any of Examples 28-42, and wherein determining the activity of the alternate reality character comprises selecting one response of the available responses based on a behavior policy associated with the alternate character.

Example 44 includes the subject matter of any of Examples 28-43, and further including determining whether the determined activity is greater than a threshold measurement of activity; and generating the video comprises skipping the current time period in response to the determined activity being less than the threshold measurement of activity.

Example 45 includes the subject matter of any of Examples 28-44, and further including generating a video of the alternate reality character performing an additional activity superimposed on the image map of the real-world environment of the home location during a second time period subsequent to the first time period; and appending the video of the second time period to the first time period to generate a video timeline of activity of the alternate character.

Example 46 includes the subject matter of any of Examples 28-45, and, further including receiving, subsequent to the first time period, a request for the generated video from a computing device; and transmitting the generated video to the computing device in response to the request.

Example 47 includes the subject matter of any of Examples 28-46, and further comprising responding to commands from the computer device to control playback of the generated video.

Example 48 includes the subject matter of any of Examples 28-47, and wherein generating the video of the alternate reality character comprises modifying the image map of the real-word environment; and generating a video of the alternate reality character performing the determined activity superimposed on the modified image map of the real-world environment of the home location during the first time period.

Example 49 includes the subject matter of any of Examples 28-48, and further including receiving a request from a computing device for a real time video of the activity of the alternate character; and generating a real time video of the alternate reality character performing the determined activity superimposed on the image map of the real-world environment of the home location; and streaming the real time video to the computing device.

Example 50 includes the subject matter of any of Examples 28-49, and further including receiving, from a mobile computing device, a request to transfer the alternate character to the mobile computing device; transferring the alternate character to the mobile computing device in response to the request; and receiving, on the mobile computing device, sensor data indicative of stimuli to which the alternate character may respond.

Example 51 includes the subject matter of any of Examples 28-50, and wherein transferring the alternate character comprises transferring a behavior policy that correlates a behavior of the alternate reality character to corresponding stimuli.

Example 52 includes the subject matter of any of Examples 28-51, and wherein transferring the alternate character comprises transferring an alternate reality application that instantiates the alternate reality character on the mobile computing device.

Example 53 includes the subject matter of any of Examples 28-52, and wherein receiving sensor data on the mobile computing device comprises receiving sensor data from a sensor included in the mobile computing device.

Example 54 includes the subject matter of any of Examples 28-53, and wherein receiving sensor data on the mobile computing device comprises receiving sensor data from a sensor remote to the mobile computing device.

Example 55 includes the subject matter of any of Examples 28-54, and further including transmitting the sensor data received on the mobile computing device to the alternate reality server.

Example 56 includes the subject matter of any of Examples 28-55, and further including determining, on the mobile computing device, available responses of the alternate reality character to stimuli represented by the sensor data received on the mobile computing device; determining, on the mobile computing device, an activity of the alternate reality character for a second time period based on the available responses; and generating, on the mobile computing device, a video of the alternate reality character performing the determined activity during the second time period.

Example 57 includes one or more machine readable storage media comprising a plurality of instructions stored thereon that in response to being executed result in a computing device performing the method of any of Examples 28-56.

Example 58 includes an alternate reality server to represent alternate reality characters in a real-world environment, the alternate reality server comprising means for generating an image map of a real-world environment of a home location of an alternate reality character; means for receiving sensor data from a plurality of sensors of a sensor network of the home location; means for determining available responses of the alternate reality character to stimuli represented by the sensor data; means for determining an activity of the alternate reality character for a first time period based on the available responses; and means for generating a video of the alternate reality character performing the determined activity superimposed on the image map of the real-world environment of the home location during the first time period.

Example 59 includes the subject matter of Example 58, and further including means for transmitting the video of the alternate reality character to a computing device for playback thereon at a second time period subsequent to the first time period.

Example 60 includes the subject matter of any of Examples 58 and 59, and wherein means for generating the image map comprises means for generating the image map of the real-world environment using cameras of the sensor network.

Example 61 includes the subject matter of any of Examples 58-60, and wherein means for receiving the sensor data comprises means for receiving image data generated by a camera sensor of the sensor network.

Example 62 includes the subject matter of any of Examples 58-61, and wherein means for receiving the sensor data comprises means for receiving motion data generated by a motion sensor of the sensor network.

Example 63 includes the subject matter of any of Examples 58-62, and wherein means for receiving the sensor data comprises means for receiving audio data generated by an audio sensor of the sensor network.

Example 64 includes the subject matter of any of Examples 58-63, and wherein means for receiving the sensor data comprises means for receiving sensor data generated by a light sensor of the sensor network.

Example 65 induces the subject matter of any of Examples 58-4 and further including means for receiving sensor data from a sensor remote from the home location.

Example 66 includes the subject matter of any of Examples 58-65, and wherein means for determining the available responses comprises means for determining available responses of the alternate reality character to the stimuli based on a behavior policy stored on the alternate reality server that correlates a behavior of the alternate reality character to corresponding stimuli.

Example 67 includes the subject matter of any of Examples 58-66, and, wherein means for receiving sensor data comprises means for receiving data indicative of a remote user's interaction with the alternate reality character, and means for determining the available responses comprises means for determining a response of the alternate reality character to the remote user's interaction.

Example 68 includes the subject matter of any of Examples 58-67, and wherein means for receiving sensor data comprises means for receiving interaction data indicative of an interaction with the alternate reality character from another alternate reality character, and means for determining the available responses comprises means for determining, a response of the alternate reality character to the interaction from the another alternate reality character.

Example 69 includes the subject matter of any of Examples 58-68, and wherein means for receiving sensor data comprises means for receiving event data indicative of a priority event occurring in the home location, and means for determining available responses comprises means for determining a response of the alternative reality character to the priority even based on the event data.

Example 70 includes the subject matter of any of Examples 58-69 and wherein means for receiving sensor data comprises means for receiving a command from a remote computing device, and means for determining available responses comprises means for determining a response of the alternative reality character to the received command.

Example 71 includes the subject matter of any of Examples 58-70, and wherein means for receiving sensor data comprises means for receiving video data indicative of the presence of a person in the home location, and means for determining available responses comprises (i) means for determining an identity of the person and (ii) means for determining a response of the alternative reality character based on the identity of the person.

Example 72 includes the subject matter of any of Examples 58-71, and wherein means for receiving sensor data comprises means for receiving environmental data indicative of an environmental condition at the home location, and means for determining available responses comprises means for determining a response of the alternative reality character based on the determined environmental condition.

Example 73 includes the subject matter of any of Examples 58-72 and wherein means for determining the activity of the alternate reality character comprises means for selecting one response of the available responses based on a behavior policy associated with the alternate character.

Example 74 includes the subject matter of any of Examples 58-73, and further including g means for determining whether the determined activity is greater than a threshold measurement of activity; and means for generating the video comprises skipping the current time period in response to the determined activity being less than the threshold measurement of activity.

Example 75 includes the subject matter of any of Examples 58-74, and further including means for generating a video of the alternate reality character performing an additional activity superimposed on the image map of the real-world environment of the home location during a second time period subsequent to the first time period; and means for appending the video of the second time period to the first time period to generate a video timeline of activity of the alternate character.

Example 76 includes the subject matter of any of Examples 58-75, and further including means for receiving, subsequent to the first time period, a request for the generated video from a computing device; and means for transmitting the generated video to the computing device in response to the request.

Example 77, includes the subject matter of any of Examples 58-76, and further including means for responding to commands from the computer device to control playback of the generated video.

Example 78 includes the subject matter of any of Examples 58-77, and wherein means for generating the video of the alternate reality character comprises means for modifying the image map of the real-word environment; and means for generating a video of the alternate reality character performing the determined activity superimposed on the modified image map of the real-world environment of the home location during the first time period.

Example 79 includes the subject flatter of any of Examples 58-78, and further including means for receiving, from a mobile computing device, a request to transfer the alternate character to the mobile computing device; and means for transferring the alternate character to the mobile computing device in response to the request.

Example 80 includes the subject matter of any of Examples 58-79, and wherein means for transferring the alternate character comprises means for transferring a behavior policy that correlates a behavior of the alternate reality character to corresponding stimuli.

Example 81 includes the subject matter of any of Examples 58-80 and wherein means for transferring the alternate character comprises means for transferring an alternate reality application that instantiates the alternate reality character on the mobile computing device.

Example 82 includes the subject matter of any of Examples 58-81, and further including means for receiving sensor data from the mobile computing device while the alternate character is transferred thereto; and means for generating the video of the alternate reality character based on the sensor data received from the mobile computing device.

Example 83 includes the subject flatter of any of Examples 58-82, and further including means for transferring the video generated based on the sensor data received from the mobile computing device to the mobile computing device.

The invention claimed is:

1. An alternate reality server to represent alternate reality characters in a real-world environment, the alternate reality server comprising:
   a sensor aggregation module to (i) generate an image map of a real-world environment of a home location of an alternate reality character and (ii) receive sensor data from a plurality of sensors of a sensor network of the home location;
   a database having stored therein a behavior policy that correlates a behavior of the alternate reality character to corresponding stimuli;
   an activity determination module to (i) determine, based on the behavior policy, a set of predefined available responses of the alternate reality character to stimuli represented by the sensor data and experienced by the alternate reality character, wherein the alternate reality character is representative of a creature not detected by the alternate reality server in the real-world environment, and (ii) select one of the predefined available responses as a function of historic data indicative of previous responses of the alternate reality character to determine an activity of the alternate reality character for a first time period; and a video generation module to superimpose the alternate reality character performing the determined activity on the image map of the real-world environment of the home location during the first time period.

2. The alternate reality server of claim 1, further comprising an interface module to transmit the video of the alternate reality character to a computing device for playback thereon at a second time period subsequent to the first time period.

3. The alternate reality server of claim 1, wherein the sensor data comprises sensor data generated by at least one of: a camera sensor of the sensor network, a motion sensor of the sensor network, an audio sensor of the sensor network, and a light sensor of the sensor network.

4. The alternate reality server of claim 1, wherein the activity determination module is further to:
  determine whether the determined activity is greater than a threshold measurement of activity; and
  skip the current time period in response to the determined activity being less than the threshold measurement of activity.

5. The alternate reality server of claim 1, wherein the activity determination module is further to:
  generate a video of the alternate reality character performing an additional activity superimposed on the image map of the real-world environment of the home location during a second time period subsequent to the first time period; and
  append the video of the second time period to the first time period to generate a video timeline of activity of the alternate reality character.

6. The alternate reality server of claim 1, further comprising an interface module to:
  receive, subsequent to the first time period, a request for the generated video from a computing device; and
  transmit the generated video to the computing device in response to the request.

7. The alternate reality server of claim 1, further comprising an interface module to receive a request from a computing device for a real time video of the activity of the alternate reality character, and
  wherein the activity determination module is further to generate a real time video of the alternate reality character performing the determined activity superimposed on the image map of the real-world environment of the home location, and
  wherein the interface module is further to stream the real time video to the computing device.

8. The alternate reality server of claim 1, further comprising an interface module to:
  receive, from a mobile computing device, a request to transfer the alternate reality character to the mobile computing device; and
  transfer the alternate reality character to the mobile computing device in response to the request.

9. The alternate reality server of claim 8, wherein:
  the interface module is to receive sensor data from the mobile computing device while the alternate reality character is transferred thereto; and
  the video generation module is to generate the video of the alternate reality character based on the sensor data received from the mobile computing device.

10. A method for representing alternate reality characters in a real-world environment, the method comprising:
  generating, on an alternate reality server, an image map of a real-world environment of a home location of an alternate reality character;
  receiving, on the alternate reality server, sensor data from a plurality of sensors of a sensor network of the home location;
  determining, on the alternate reality server and based on a behavior policy in a database that correlates a behavior of the alternate reality character to a corresponding stimuli, a set of predefined available responses of the alternate reality character to stimuli represented by the sensor data and experienced by the alternate reality character, wherein the alternate reality character is representative of a creature not detected by the alternate reality server in the real-world environment;
  selecting, on the alternate reality server, one of the predefined available responses as a function of historic data indicative of previous responses of the alternate reality character to determine an activity of the alternate reality character for a first time period; and
  generating, on the alternate reality server, a video by superimposing the alternate reality character performing the determined activity on the image map of the real-world environment of the home location during the first time period.

11. The method of claim 10, further comprising transmitting the video of the alternate reality character to a computing device for playback thereon at a second time period subsequent to the first time period.

12. The method of claim 10, wherein receiving the sensor data comprises receiving data from at least one of: a camera sensor of the sensor network, a motion sensor of the sensor network, an audio sensor of the sensor network, and a light sensor of the sensor network.

13. The method of claim 10, further comprising:
  determining whether the determined activity is greater than a threshold measurement of activity; and
  generating the video comprises skipping the current time period in response to the determined activity being less than the threshold measurement of activity.

14. The method of claim 10, further comprising generating a video of the alternate reality character performing an additional activity superimposed on the image map of the real-world environment of the home location during a second time period subsequent to the first time period; and
  appending the video of the second time period to the first time period to generate a video timeline of activity of the alternate reality character.

15. The method of claim 10, further comprising:
  receiving, subsequent to the first time period, a request for the generated video from a computing device; and
  transmitting the generated video to the computing device in response to the request.

16. The method of claim 10, further comprising:
  receiving a request from a computing device for a real time video of the activity of the alternate reality character;
  generating a real time video of the alternate reality character performing the determined activity superimposed on the image map of the real-world environment of the home location; and
  streaming the real time video to the computing device.

17. One or more non-transitory machine readable storage media comprising a plurality of instructions stored thereon that, in response to being executed, cause an alternate reality server to:
  generate an image map of a real-world environment of a home location of an alternate reality character;
  receive sensor data from a plurality of sensors of a sensor network of the home location;

determine, based on a behavior policy in a database that correlates a behavior of the alternate reality character to a corresponding stimuli, a set of predefined available responses of the alternate reality character to stimuli represented by the sensor data and experienced by the alternate reality character, wherein the alternate reality character is representative of a creature not detected by the alternate reality server in the real-world environment;

select one of the predefined available responses as a function of historic data indicative of previous responses of the alternate reality character to determine an activity of the alternate reality character for a first time period; and superimpose, in a video, the alternate reality character performing the determined activity on the image map of the real-world environment of the home location during the first time period.

18. The non-transitory machine readable storage media of claim 17, wherein the plurality of instructions further causes the alternate reality server to transmit the video of the alternate reality character to a computing device for playback thereon at a second time period subsequent to the first time period.

19. The alternate reality server of claim 1, wherein the activity determination module is further to:

determine an amount of the stimuli from the sensor data;

determine whether the amount of stimuli satisfies a threshold level; and determine, in response to a determination that the amount of stimuli does not satisfy the threshold level that the alternate reality character is not to perform an activity.

20. The alternate reality server of claim 1, wherein the activity determination module is further to:

determine, as function of the behavior policy, a priority of an event indicated by the sensor data; and determine the activity as a function of the priority.

21. The alternate reality server of claim 1, wherein the activity determination module is further to determine the activity in response to an action of at least one other alternate reality character maintained by the alternate reality server.

22. The alternate reality server of claim 1, wherein the alternate reality server is a cloud alternate reality server that is remote to the home location, and wherein to receive the sensor data comprises to receive the sensor data through an external network.

* * * * *